(12) United States Patent
Fowler et al.

(10) Patent No.: US 9,339,856 B2
(45) Date of Patent: May 17, 2016

(54) TRANSDERMAL PATCH DISPOSAL SYSTEM

(71) Applicant: Teikoku Pharma USA, Inc., San Jose, CA (US)

(72) Inventors: William V. Fowler, Minneapolis, MN (US); Carter R. Anderson, Inver Grove Heights, MN (US)

(73) Assignee: Teikoku Pharma USA, Inc., San Jose, CA (US)

( * ) Notice: Subject to any disclaimer, the term of this patent is extended or adjusted under 35 U.S.C. 154(b) by 0 days.

(21) Appl. No.: 14/304,389

(22) Filed: Jun. 13, 2014

(65) Prior Publication Data

US 2014/0296608 A1    Oct. 2, 2014

Related U.S. Application Data (63) Continuation of application No. 13/629,246, filed on Sep. 27, 2012, now Pat. No. 8,790,583.

(60) Provisional application No. 61/542,050, filed on Sep. 30, 2011.

(51) Int. Cl.
*B09B 3/00*    (2006.01)
*A62D 3/30*    (2007.01)

(52) U.S. Cl.
CPC .............. *B09B 3/0075* (2013.01); *A62D 3/30* (2013.01); *B09B 2220/14* (2013.01); *Y10T 428/1476* (2015.01); *Y10T 428/2476* (2015.01); *Y10T 428/24752* (2015.01); *Y10T 428/28* (2015.01); *Y10T 428/2848* (2015.01)

(58) Field of Classification Search
CPC .................................................. B09B 2220/14
USPC ......... 422/184.1, 276, 277; 588/400; 156/323
See application file for complete search history.

(56) References Cited

U.S. PATENT DOCUMENTS

| | | | |
|---|---|---|---|
| 4,588,580 | A | 5/1986 | Gale et al. |
| 4,909,256 | A | 3/1990 | Peck |
| 5,149,538 | A | 9/1992 | Granger et al. |
| 5,236,714 | A | 8/1993 | Lee et al. |
| 5,396,901 | A | 3/1995 | Phillips |
| 5,597,617 | A | 1/1997 | DeLiso et al. |

(Continued)

FOREIGN PATENT DOCUMENTS

| | | |
|---|---|---|
| JP | 2001-774 A | 1/2001 |
| JP | 2005-502391 A | 1/2005 |

(Continued)

OTHER PUBLICATIONS

Greensher et al., "Ascendency of the Black Bottle (Activated Charcoal)", Pediatrics (1987), 80(6):949-951.

(Continued)

*Primary Examiner* — Lessanework Seifu
(74) *Attorney, Agent, or Firm* — Bret E. Field; Bozicevic, Field & Francis LLP (57) ABSTRACT

Devices for use in the disposal of pharmaceutical compositions are provided. Aspects of the devices include: a support having a surface; an activated carbon layer present on the surface; and an adhesive for stably associating a pharmaceutical composition with the activated carbon layer upon application of the pharmaceutical composition to the activated carbon layer. Also provided are methods of using the devices and kits containing the devices.

22 Claims, 7 Drawing Sheets

(56) References Cited

U.S. PATENT DOCUMENTS

| | | |
|---|---|---|
| 5,804,215 A | 9/1998 | Cubbage et al. |
| 5,899,856 A | 5/1999 | Schoendorfer et al. |
| 6,261,595 B1 | 7/2001 | Stanley et al. |
| 6,261,596 B1 | 7/2001 | Li et al. |
| 6,279,736 B1 | 8/2001 | Hekal |
| 6,449,990 B1 | 9/2002 | Kawajiri et al. |
| 6,660,901 B2 | 12/2003 | Church |
| 7,704,598 B2 | 4/2010 | Jain et al. |
| 7,918,776 B2 | 4/2011 | Day |
| 2002/0150606 A1 | 10/2002 | Yamada |
| 2002/0187183 A1 | 12/2002 | Becher et al. |
| 2003/0068392 A1 | 4/2003 | Sackler |
| 2003/0078552 A1 | 4/2003 | Tepper et al. |
| 2004/0013716 A1 | 1/2004 | Gale et al. |
| 2004/0033255 A1 | 2/2004 | Baker et al. |
| 2004/0126323 A1 | 7/2004 | Shevchuk et al. |
| 2004/0146547 A1 | 7/2004 | Marcenyac et al. |
| 2004/0241218 A1 | 12/2004 | Tavares et al. |
| 2005/0037059 A1 | 2/2005 | Miller, II |
| 2005/0070835 A1 | 3/2005 | Joshi |
| 2005/0163717 A1 | 7/2005 | Anderson et al. |
| 2005/0211099 A1 | 9/2005 | Doughty et al. |
| 2005/0266228 A1 | 12/2005 | Jain et al. |
| 2006/0110080 A1 | 5/2006 | Thomas et al. |
| 2007/0122463 A1 | 5/2007 | Ko |
| 2007/0250339 A1 | 10/2007 | Mallett et al. |
| 2008/0274168 A1 | 11/2008 | Baker et al. |
| 2009/0131732 A1 | 5/2009 | Day |
| 2009/0180936 A1 | 7/2009 | Anderson et al. |
| 2010/0068250 A1 | 3/2010 | Anderson et al. |

FOREIGN PATENT DOCUMENTS

| | | |
|---|---|---|
| JP | 2005-538058 A | 12/2005 |
| JP | 2007-518819 A | 7/2007 |
| JP | 2008-500205 A | 1/2008 |
| WO | WO9414062 A1 | 6/1994 |
| WO | WO02085268 A1 | 10/2002 |
| WO | WO02087482 A1 | 11/2002 |
| WO | WO03103673 A1 | 12/2003 |
| WO | WO2005070003 A2 | 8/2005 |
| WO | WO2005118280 A1 | 12/2005 |
| WO | WO2009019668 A2 | 2/2009 |
| WO | WO2010110837 A1 | 9/2010 |

OTHER PUBLICATIONS

Kansas Department of Health and Environment, "Technical Guidance Document SW 07-01: Disposal Options for Expired or Surplus Medications/Pharamceuticals", 2007.

Living on Earth.org online interview with the EPA, Oct. 3, 2008.

Marquardt et al., "Fentanyl remaining in a transdermal system following three days of continuous use", Ann Pharmacother (1995), 29(10):969-971.

Stoppler, "Expired Medication Disposal: The "Green" way to dispose of old or unused medications", http://www.emedicinehealth.com (2008).

Sassaman et al., "Prevent Placing Pharmaceuticals in Travis Water System", Air Force Print News Today (Mar. 24, 2008).

Yerasi et al., "Disposal of used fentanyl patches", Am J Health Syst Pharm (1997), 54(1):85-86.

Zambaux et al., "Validation of a method to inactivate fentanyl in the used devices of Durogesic", Ann Pharm Fr (2000), 58(3):176-179.

Zoraflex ACC, 100% Activated Woven Carbon Cloth, Calgon Carbon Corporation (2008), 2pp.

PCTUS2012/057607, Notification of Transmittal of the International Search Report and the Written Opinion of the International Searching Authority, or the Declaration, Mailed on Jan. 3, 2013, 8 pages.

FIG. 5

TRANSDERMAL PATCH DISPOSAL SYSTEM

CROSS-REFERENCE TO RELATED APPLICATIONS

Pursuant to 35 U.S.C. §119(e), this application claims priority to the filing date of U.S. Provisional Patent Application Ser. No. 61/542,050 filed on Sep. 30, 2011; the disclosure of which application is herein incorporated by reference.

INTRODUCTION

The temptation and potential for prescription drug abuse by ingestion, injection, etc., and particularly, of narcotics and other controlled substances is well known. This widespread abuse issue is exemplified by the current problems associated with morphine, oxycontin, fentanyl, and many others.

Unfortunately, problems associated with medications are not limited to abusable narcotics. According to a recent investigative report by the Associated Press, Americans flush 250 million pounds of pharmaceuticals down the drain every year (reference: Living on Earth.org online interview with the EPA, Oct. 3, 2008). Furthermore, this practice of pharmaceutical composition disposal has resulted in contamination of the drinking water supply of numerous major cities throughout the U.S. (See e.g., Air Force Print News Today, Mar. 24, 2008).

These contaminants pose risk to the environment; affecting people, fish and wildlife. Potential problems include abnormal physiological processes, reproductive impairment, increased evidence of cancer, and development of anti-microbial resistant organisms (See e.g., Kansas Dept of Health and Environment, Mar. 22, 2007). A significant source of pharmaceutical environmental contamination lies with disposal of unused or expired medications (See e.g., eMedicineHealth Mar. 21, 2008). Historically, these medications are flushed down the toilet or thrown into the trash, with a likely outcome that they will eventually end up in groundwater supplies. The only medications that the FDA condones flushing down the toilet are controlled substances with abuse potential. Thus, many people are faced with a dilemma of how best to dispose of unused and expired medications.

Of particular interest is the potential for abuse or environmental release associated with medications contained in transdermal patch technology. Unfortunately, with transdermal patches significant amounts of drug compound remain in the patches after patients have worn them for the prescribed period of time. The need for this excess amount of drug is well known; it is required to ensure an adequate driving force in the transdermal application for the full wear time period. For example, in a published test of Duragesic® fentanyl transdermal system (Janssen Pharmaceuticals) patches worn for the full 72-hour wear period, 28-84.4% of the original loading of fentanyl still remained in the patches. The authors of the study concluded that the residual dosage represented amounts sufficient for abuse and misuse and was even potentially lethal (Marquardt et al, Ann Pharmacother, 1995, 29:969-71).

SUMMARY

Devices for use in the disposal of pharmaceutical compositions are provided. Aspects of the devices include: a base having a surface; an activated carbon layer present on the surface; and an adhesive for stably associating a pharmaceutical composition with the activated carbon layer upon application of the pharmaceutical composition to the activated carbon layer. Also provided are methods of using the devices and kits containing the devices.

DETAILED DESCRIPTION

Devices for use in the disposal of pharmaceutical compositions are provided. Aspects of the devices include: a base having a surface; an activated carbon layer present on the surface; and an adhesive for stably associating a pharmaceutical composition with the activated carbon layer upon application of the pharmaceutical composition to the activated carbon layer. Also provided are methods of using the devices and kits containing the devices.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In further describing various embodiments of the invention, aspects of the devices are reviewed first in greater detail, followed by a detailed description of embodiments of using the devices and a review of kits that include the devices.

Devices

As summarized above, devices for use in disposal of pharmaceutical compositions are provided. Aspects of the devices include a support having an activated carbon layer present on the surface thereof. The support may vary widely depending on the particular embodiment, having a number of different possible configurations. In some instances, the support is one that includes a planar surface on which the activated carbon layer is present. While the dimensions and weight of the support may vary widely, in some instances the support is configured to be hand-held, e.g., where the longest dimension of the support is 20 cm or less, such as 15 cm or less, including 10 cm or less, and the weight of the support is 1 lb or less, such as 0.5 lb or less, including 0.25 lb or less, e.g., 0.10 lb or less, such as 0.05 lb or less. The support may be fabricated from a variety of different types of materials, including but not limited to polymeric materials, glasses, metals, etc., and may be rigid or flexible, as desired. In some instances, the support is fabricated from a polymeric material, e.g., polyvinylchloride, polyethylene, polyvinylacetate, etc., which materials may be transparent, translucent or opaque, as desired.

As summarized above, present on a surface of the support, e.g., a planar surface of the support, is an activated carbon layer. The term "activated carbon" is used in its conventional sense to refer to a form of carbon that has been processed to provide for a surface area in excess of 500 $m^2/g$, e.g., 1000 to 2000 $m^2/g$. In the broadest sense, the activated carbon may be in a particulate form, e.g., powder, granular or pelletized form, or other convenient form, such as a cloth (e.g., ZOR-FLEX® activated carbon cloth), paper, etc. Powdered activated carbon is a particular (i.e., made up of particles) carbon composition having an average particle size of 0.25 mm or less, e.g., from 0.15 to 0.25 mm, while granular or pelletized activated carbon is made up of particles or pellets having an average size of 0.25 mm or higher, such as from 0.25 to 5.0 mm. Cloths and papers may include a substrate material impregnated with activated carbon, e.g., powdered activated carbon, or be entirely made of activated carbon, e.g., ZOR-FLEX® activated carbon cloths (such as ZORFLEX® FM100 activated carbon cloth, Calgon Carbon Corporation).

Devices of the invention also include an adhesive, which may be associated with the support and/or activated carbon layer, or associated with another component of the device, e.g., a cover, where the adhesive serves to stably associate the pharmaceutical composition with the activated carbon layer upon application of the pharmaceutical composition with the activated carbon layer. In some instances, the adhesive is present on a surface of the support, e.g., a perimeter area at least partially surrounding the activated carbon layer. In some instances the adhesive is combined with the activated carbon layer. In yet other instances, the adhesive may be present on a cover component of the device, which may or may not be attached to the support. Any convenient adhesive may be employed in the device, so long as the adhesive is sufficient for stably associating a pharmaceutical composition with the activated carbon layer upon application of the pharmaceutical composition to the activated carbon layer. Adhesives of interest include, but are not limited to adhesives commonly employed in topical patch and tape compositions, such as naturally occurring and synthetic adhesives, e.g., polyacrylate adhesives, SIS and SBS adhesives, etc.

The devices may be configured for use with a variety of different types of pharmaceutical compositions, which compositions are generally solid compositions, such as pills (i.e., tablets), capsules, topical compositions, such as patches or tapes, among other forms.

In some instances, the devices are configured for disposal of a topical pharmaceutical composition, such as a pharmaceutical patch or tape. Of interest in these embodiments are devices in which the support is a planar foldable support that includes a surface having first and second domains separated by a fold line. In certain of these instances, the support may be planar thin support, e.g., having a thickness ranging from 0.5 to 5 mm, such as 1 to 2.5 mm. The support may be dimensioned to accommodate a transdermal patch or tape. As such, in these embodiments the support may have a length ranging 1 cm to 75 cm and a width ranging from 1 cm to 20 cm, depending on the particular transdermal pharmaceutical composition for which the device has been configured.

The fold line is a pre-fabricated structure, such as a crease, which provides for a predetermined fold region of the support when a folding force is a applied to the support. The fold line may be a continuous structure extending from one edge of the planar support to the other, or a discontinuous structure, e.g., where the fold line is a perforated line.

Present on the surface of the first domain of the support is an adhesive layer. The adhesive layer may be made up of any suitable adhesive, e.g., as described above. The adhesive layer may cover the entire first domain, and may be coextensive with the edges of the support in the first domain. Alternatively, the adhesive layer may be present along a perimeter of the first domain. Any suitable configuration may be employed, so long as the adhesive layer secures the folded structure produced upon folding the foldable support during use.

Present on the surface of the second domain of the support is an activated carbon layer. The activated carbon layer may be of any convenient format, such as those described above, including particular, cloth or paper format. In some instances, the activated carbon layer is dimensioned to correspond to an active agent layer of a pharmaceutical patch, e.g., where the dimensions of the activated carbon layer range from 1×1 cm to 20×50 cm. The activated carbon layer may have any convenient configuration. In some instances, the activated carbon layer is configured such that a perimeter is provided between the activated carbon layer and all of the edges of the support in the second domain. The width of this perimeter may vary, ranging in some instances from 1 to 10 mm, such as 1 to 5 mm. This configuration may be viewed as an "island" configuration. In yet other instances, the activated carbon layer may be configured so that it has at least one edge that is co-extensive with an edge of the support in the second domain, i.e., such that it has at least one edge that extends to an edge of the second domain of the foldable support. The amount of activated carbon in a given layer may vary, and may be selected to be more than theoretically required to substantially inactivate the amount of active agent in the pharmaceutical composition for which the device has been configured. While the exact amount may vary, in some instances the weight ratio of activated carbon to active agent is 2 (i.e., 2/1) or higher, such as 3 or higher, including 4 or higher, such as 5 or higher.

Where desired, the support may include one or more liquid passageways extending through the support and configured to provide liquid access from the bottom of the support to the bottom of the adhesive layer. The number of openings may vary, ranging from 1 to 10, such as 2 to 5, where the openings may have any suitable diameter, e.g., 1 to 5 mm, including 2 to 4 mm.

In some instances, the devices include a liquid absorbent pad. In such instances, the liquid absorbent layer may be positioned between the activated carbon layer and the surface of the second domain. The liquid absorbent pad may be fabricated from any convenient material, where suitable materials of interest include, but are not limited to cellulosic materials, polymeric materials, etc. In some instances, the absorbent pad material is made up of hydrophilic materials from a list including Ahlstrom materials catalog numbers 270 and 320, Schleicher & Schuell catalog numbers 300 and 900 among others. Those skilled in the art know that numerous materials meeting these requirements exist, such as various cotton linters, for example Schleicher & Schuell (US) papers 300, 900, 903 or 2992, fiber composite materials such as materials available from Ahlstrom (US) for instance Ahlstrom 270, a multi-purpose cellulose material that has been used for fluid collection and release and Ahlstrom grade 320 material, a material with hydrophobic characteristics. Also glass fiber, certain polymeric materials, spunbound polyester materials (e.g. Hollytex brand from Ahlstrom, (US), extruded fibers, other cellulose papers manufactured from raw material cellulose (e.g. Ahlstrom Paper group (US) and Filtrona (US) Transorb® materials), mixed fiber papers (e.g. Whatman (UK) Pads S9036-2009) as well as two-ply materials for example. The properties of these materials vary from absorbent materials with low protein binding capability to those with high binding capacity. Materials are available in various thicknesses and sizes and may be easily customized to suit the specific intended application for the pad material. Already, a diverse range of product materials is available form several sources including Schleicher & Schuell, Ahlstrom, Filtrona, Porex, Whatman and others as described above.

In addition to the activated carbon layer, the devices may include other substances which in some way render the active agent of the pharmaceutical composition unusable. Accordingly, the devices may contain one or more of an antagonist, an oxidizing compound, an irritant compound or an anti-abuse distressing agent. Such compounds may be used singly or in combination. Where desired, such compounds may be pre-adsorbed on a portion of the activated carbon and/or the adhesive, as desired, e.g., where such compounds are present on the first and/or second domains. Antagonists of interest are those which exhibit antagonist activity relative to the active agent of the pharmaceutical composition, e.g., naloxone or naltrexone for opioids. Examples of such oxidizing agents include perborates, percarbonates, peroxides, and hypochlorites. Examples of irritant compounds include capsaicin or ipecac. Examples of anti-abuse distressing agents include bitter taste agents, such as dehydrocholic acid.

In some instances the foldable support includes a third domain adjacent to the second domain at an edge opposite the fold line, such that the device has a tri-fold structure, e.g., as described in greater detail below. The third domain may include an adhesive on a surface thereof, which adhesive may be analogous to the adhesive present in the first domain.

In addition, one or more domains of the support and components present on a surface thereof (e.g., the activated carbon layer, the adhesive) may be covered with a release liner. The release liner facilitates the protection of the underlying components, e.g., the adhesive and activated carbon layers. The release liner may be prepared by treating one side of polyethylene-coated wood free paper, polyolefin-coated glassine paper, a polyethylene terephthalate (polyester) film, a polypropylene film, or the like with a silicone treatment. The release liner may be in contact with a surface of adhesive and/or activated carbon layers, as desired. One or more distinct release liners may be present. For example, the device may include w a first release liner covering the first and second domains and a second release liner covering the third domain.

Figure 1A:
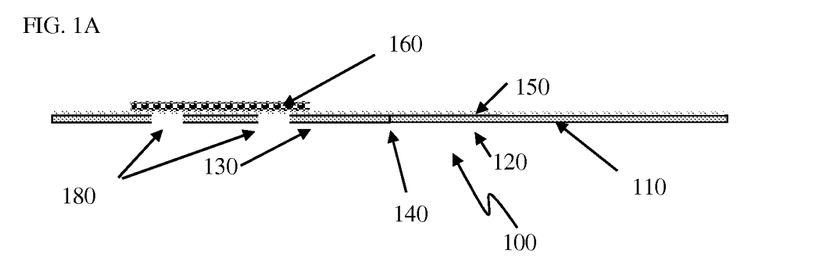
FIGS. 1A to 1C provide depictions of an embodiment a disposal device in which holes are positioned on the underside of the support opposite the activated carbon layer to allow liquid access to the activated carbon layer.
Figure 1B:
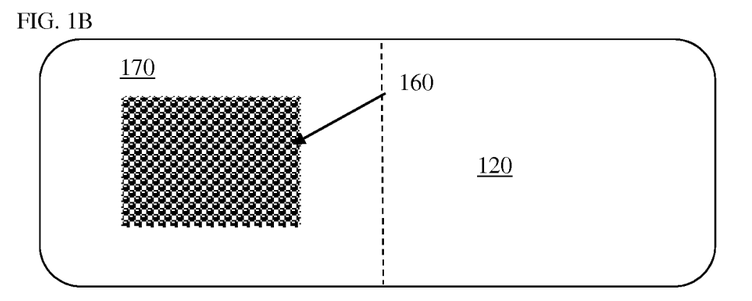
Figure 1C:
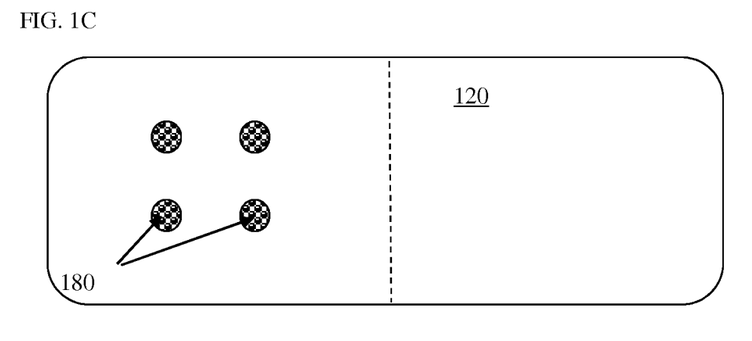
Figure 4A:
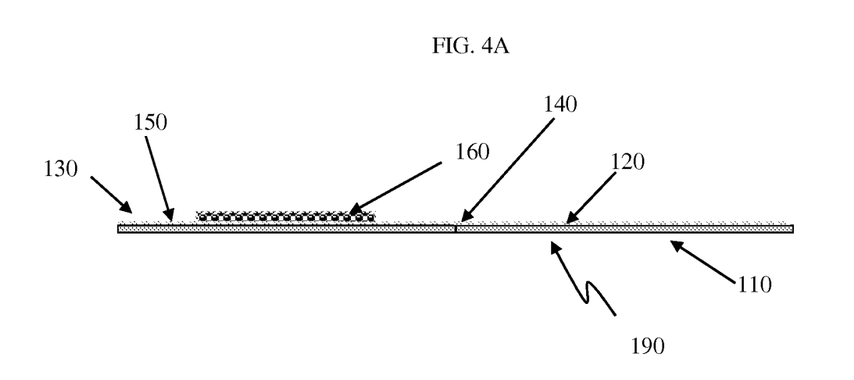
FIGS. 4A to 4H provide a depiction of another embodiment of a disposal device as well as a depiction of how use the device to dispose of a transdermal patch.
Figure 4B:
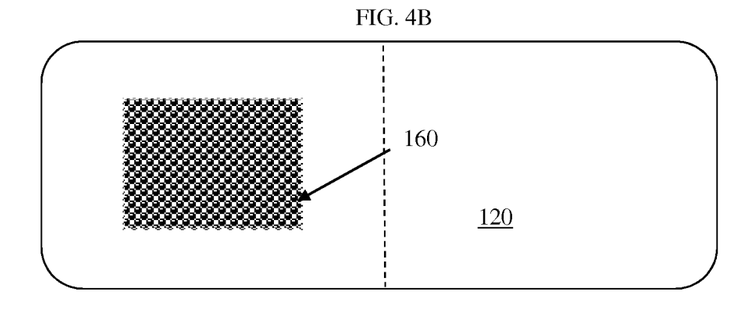
Figure 4C:
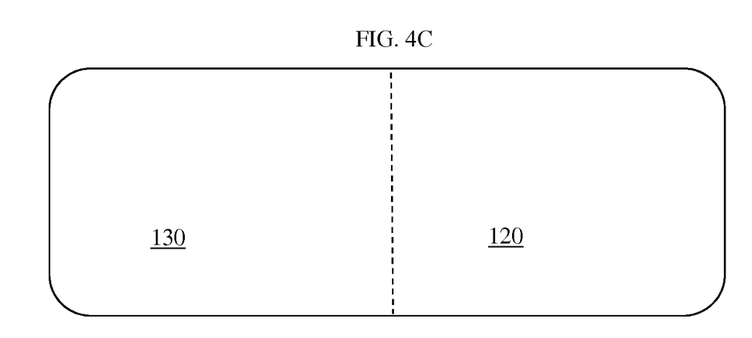

FIGS. 1A to 1C provide side, top and bottom views respectively of a patch disposal device according to an embodiment of the invention. The device 100 includes a planar thin support 110 made of a flexible material (labeled flexible backing) having first and second domains, 120 and 130 separated by a fold line 140. Covering at least a portion of, and in some instances all of, the first domain is an adhesive layer 150. Present on a surface of the second domain is a carbon fabric 160, e.g., an activated carbon cloth. The carbon fabric is configured in an "island" configuration such that it is surrounded by a perimeter region 170 (See FIG. 1B) and does not extend on any edge to the edge of the support in the second domain. Also shown are liquid passageways or vent holes 180 extending through the underside of the support to the surface of the second domain, thereby providing liquid access to the underside of the carbon fabric. FIGS. 4A to C depict side, top and bottom views respectively a device 190 that is analogous to the device of FIG. 1, but lacks liquid passageways.

Figure 3A:
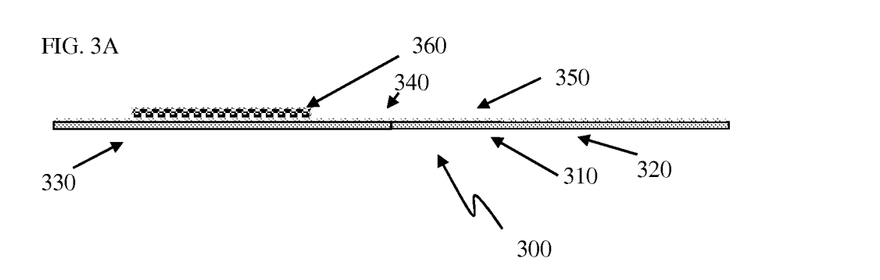
FIGS. 3A to 3G provide a depiction of another embodiment of a disposal device as well as a depiction of how use the device to dispose of a transdermal patch.
Figures 3B, 3C:
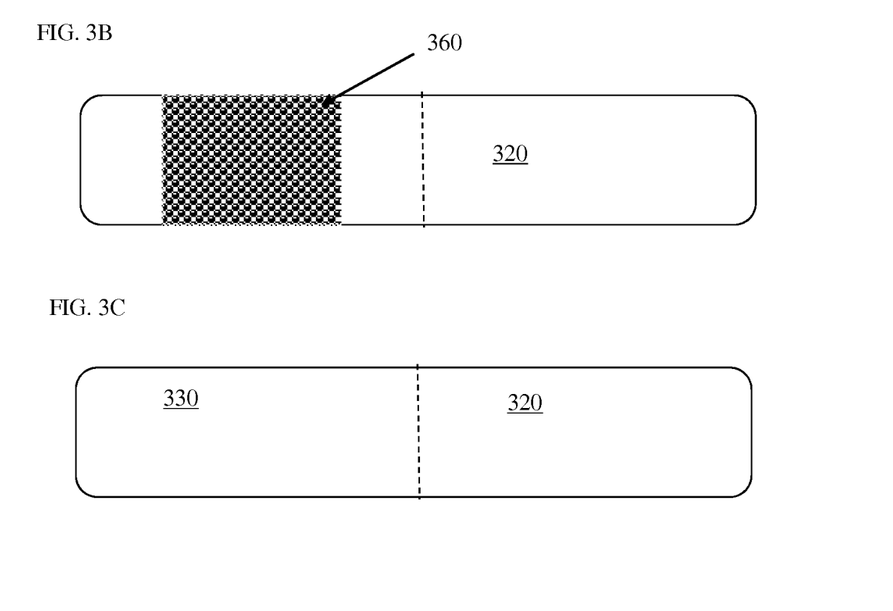

FIGS. 3A to B show a device analogous to that depicted FIGS. 1A to 1C. In FIG. 3A, the device 300 includes a planar support 310 having first 320 and second 330 domains separated by a fold line 340, analogous to the device of FIGS. 1A-C. Also present is adhesive layer 350. However, in FIGS. 3A to 3C, the activated carbon layer 360 does not have an island configuration. Instead, the activated carbon layer has first and second edges that extend to the edges of the support in the second domain.

Figure 5:
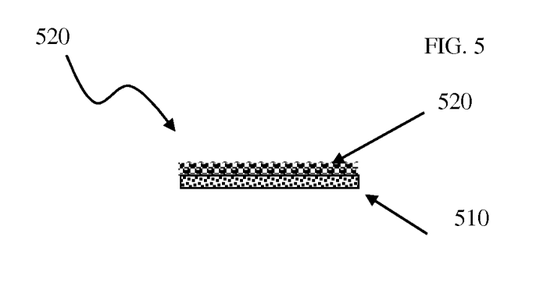
FIG. 5 provides a depiction of another embodiment of the device which includes a water absorbent layer underneath the activated carbon layer (to facilitate the absorption and retention of water, and/or to hold distressing agent).

FIG. 5 depicts yet another embodiment of a device in accordance with the invention. In FIG. 5, the device 500 includes an absorbent layer 510 (e.g., in the form of an absorbant pad) underneath the activated carbon layer 520. Where desired, the absorbent layer may include one or more different additional compounds, such as an anti-abuse distressing agent, an oxidant, an antagonist, an irritant, etc., e.g., as described above.

The devices of the invention may be fabricated according to any convenient protocol. Such methods generally include positioning an activated carbon layer, e.g., activated carbon cloth, onto a surface of a support, such as a second domain of a foldable support, e.g., as described above. Fabrication may further include placement of other components, e.g., an adsorbent pad, on the support, as described above.

Methods of Use

Aspects of the invention further include methods of disposing a pharmaceutical composition by using devices such as described above. In practicing methods of the invention, a pharmaceutical composition, such as a topical patch or tape, is contacted with an activated carbon layer of a device of the invention, e.g., as described above. Where desired, such methods may further include covering the pharmaceutical composition with a cover after the pharmaceutical composition has been contacted with the activated carbon layer.

Depending on the configuration of the device, one or more additional steps may be performed. For example, where the support is a foldable support having first and second domains separated by a fold line, the methods may further include folding the foldable support at the fold line so that a portion of the adhesive layer of the first domain contacts a region of the second domain to at least partially enclose the pharmaceutical patch between the first and second domains. In some instances, the foldable structure is one in which the pharmaceutical patch is completely enclosed between the first and second domains of the support, such that the folded structure has a closed pouch configuration which contains the pharmaceutical patch. In yet other instances, the foldable structure is one in which the pharmaceutical patch is only partially enclosed between the first and second domains of the support, such that the folded structure has a open pouch configuration which contains the pharmaceutical patch and at least one open portion.

In some embodiments, the methods include contacting the activated carbon layer with a liquid, e.g., an aqueous medium, including water. The activated carbon layer may be contacted with the liquid before or after the pharmaceutical patch is applied to the activated carbon layer. For example, where the support includes liquid passageways in the second domain, the pharmaceutical patch may be applied to the activated carbon layer and then the foldable support folded to produce a folded structure in which the pharmaceutical patch is completely enclosed. Next, liquid may be contacted with the activated carbon layer, e.g., by holding the enclosed structure under a running faucet or other source of water, such that the water may enter the liquid passageways and contact the activated carbon layer. This protocol is illustrated in FIGS. 2A to 2E. In such protocols, the patch will be exposed to the source of water for a period of time sufficient for the activated carbon layer to become sufficiently wetted, where in some instances the patch will be exposed to the source of water from 0.5 minutes or longer, such as 1 minute or longer, e.g., 2 minutes or longer, including 5 minutes or longer.

Figure 2A:
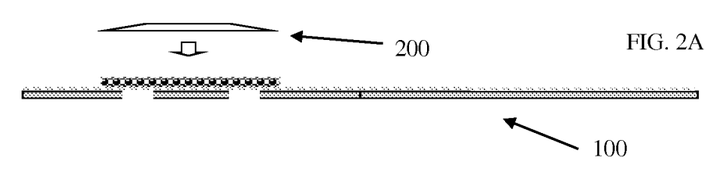
FIGS. 2A to 2E provide a depiction of how use the device shown in FIGS. 1A to 1C to dispose of a transdermal patch.
Figure 2B:
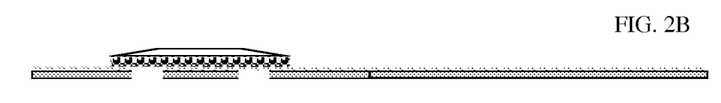
Figure 2C:
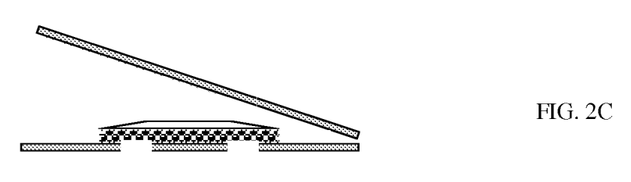
Figure 2D:
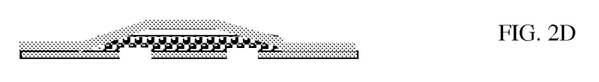
Figure 2E:
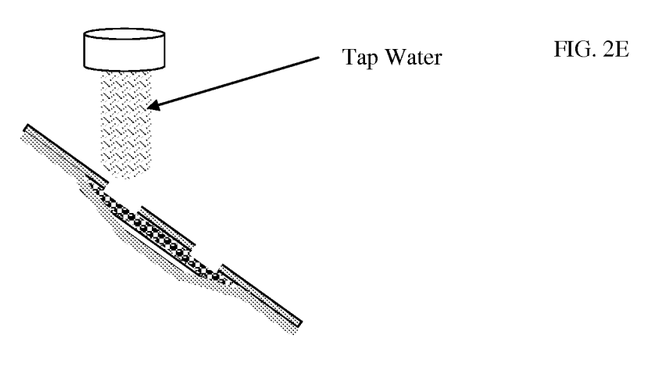

As shown in FIG. 2A used topical patch 200 is contacted with device 100, which was described above in connections with FIGS. 1A to 1C. Specifically, the drug matrix side of patch 200 is contacted with the activated carbon layer of device 100 such that the two come into contact with each other, as shown in FIG. 2B. Next, the first domain of device 100 is folded over along the fold line as illustrated in FIG. 2C to enclose the patch 200 as shown in FIG. 2D. Finally, tap water 220 is contacted with the vent holes in a manner sufficient to wet the activated carbon, as shown in FIG. 2E.

Figure 3D:
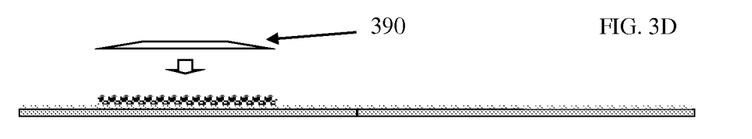
Figure 3E:
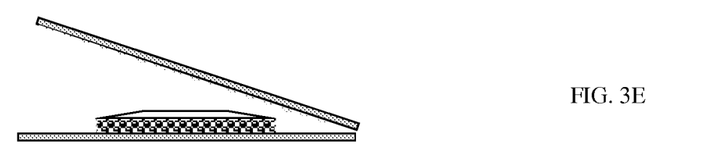
Figure 3F:
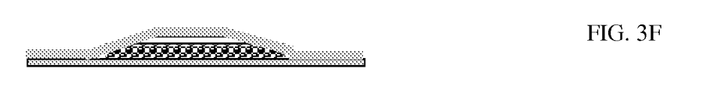
Figure 3G:
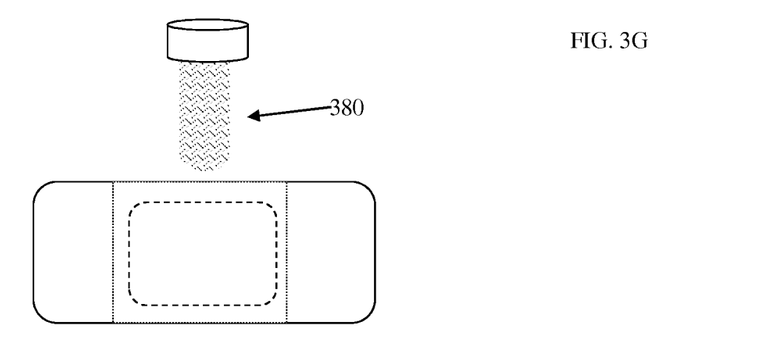

A variation of this protocol is illustrated in FIGS. 3D to 3G. In the protocol illustrated in FIGS. 3D to 3G, the pharmaceutical patch 300 is applied to the activated carbon layer 360 as shown in FIG. 3D such that the two come into contact with each other, as shown in FIG. 3E. Next, the foldable support is folded as illustrated in 3E to produce a folded structure in which the pharmaceutical patch is only partially enclosed as shown in FIG. 3F. Next, liquid 380 may be contacted with the activated carbon layer 390, e.g., by holding the open side of the partially enclosed structure under a running faucet or other source of water 380, such that the water may enter the liquid passageways and contact the activated carbon layer as shown in FIG. 3G. As with the previous device configuration, the patch will be exposed to the source of water for a period of time sufficient for the activated carbon layer to become sufficiently wetted, where in some instances the patch will be exposed to the source of water from 0.5 minutes or longer, such as 1 minute or longer, e.g., 2 minutes or longer, including 5 minutes or longer.

Figure 4D:
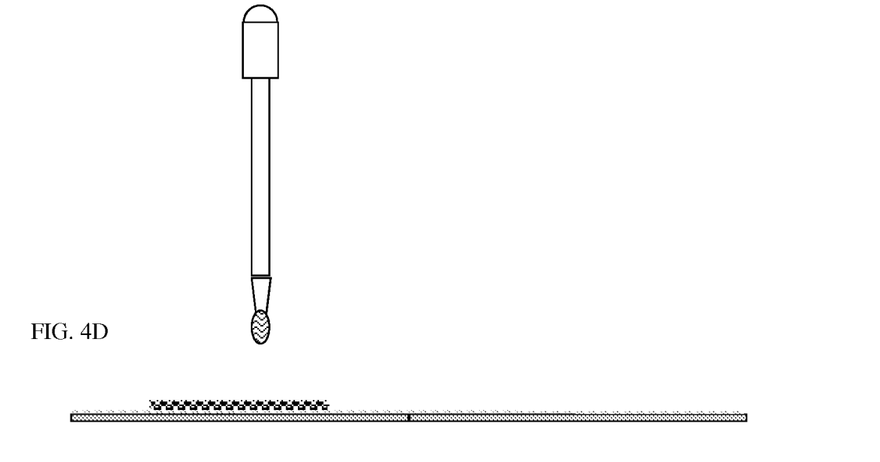
Figure 4E:
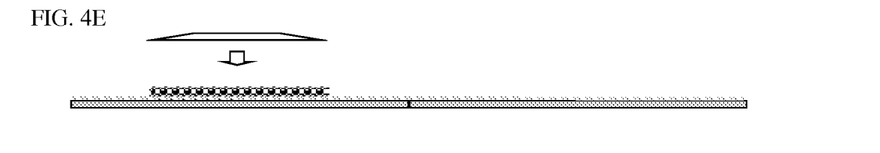
Figure 4F:
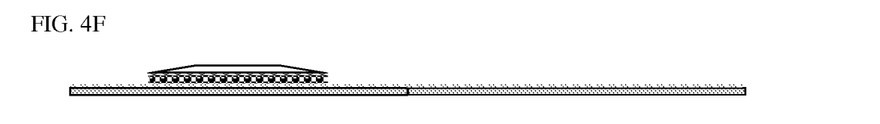
Figure 4G:
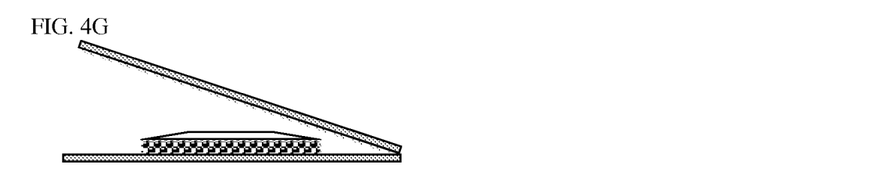
Figure 4H:
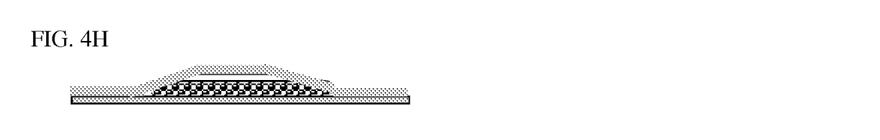

In yet other embodiments, the activated carbon layer is wetted with a liquid, e.g., water, prior to applying the pharmaceutical patch to the activated carbon layer. An example of such a protocol is illustrated in FIGS. 4D to 4H. In FIG. 4D, a suitable volume of water sufficient to wet the activated carbon layer is applied to the activated carbon layer of the device depicted in FIGS. 4A to 4C, e.g., with a dropper or other convenient liquid applicator. Next, a pharmaceutical patch is applied to the wetted activated carbon layer as shown in FIG. 4E to produce the structure shown in FIG. 4F. After application of the pharmaceutical patch to the activated carbon layer, the foldable support is folded as shown in FIG. 4G at the fold line to produce a completely enclosed folded structure as shown in FIG. 4H.

In some instances, the pharmaceutical patch may be manipulated prior to placement on the activated carbon layer. For example, the method may include cutting the active agent layer of the pharmaceutical patch prior to contacting the active agent layer with the activated carbon layer. After the pharmaceutical composition (and optionally liquid) is applied to the activated carbon layer, the resultant product may be disposed, e.g., in a municipal sanitation system.

Finally, where desired the disposal devices that include a formulation contacting the activated carbon layer, produced e.g., as described above, may be further placed into a suitable container, such as a re-sealable plastic bag, etc.

Utility

The devices of the invention find use in disposal of a variety of different types of pharmaceutical compositions, e.g., where the pharmaceutical compositions may be liquids or solids, where solid pharmaceutical compositions may be pills (i.e., tablets), capsules, topical compositions, such as patches or tapes, among other forms. Methods and devices of the invention find use is disposing any type of active agent, including those that may be subject to abuse, e.g., opioids and other painkillers, hormones, etc., in a manner that prevents abuse and is environmentally sound (e.g., in that it prevents the active agent from entering the ecosystem).

Kits

Kits for use in practicing certain methods described herein are also provided. In certain embodiments, the kits include one or more devices as described above. In certain embodiments, the kits include one or more additional components that find use in the methods, e.g., an amount of a liquid, etc., as described above. In a given kit that includes two or more compositions, the compositions may be individually packaged or present within a common container.

In certain embodiments, the kits will further include instructions for practicing the subject methods or means for obtaining the same (e.g., a website URL directing the user to a webpage which provides the instructions), where these instructions may be printed on a substrate, where substrate may be one or more of: a package insert, the packaging, reagent containers and the like. In the subject kits, the one or more components are present in the same or different containers, as may be convenient or desirable.

Additional Embodiments 1. A device for use in disposing a pharmaceutical composition, the device comprising:
    a support having a surface;
    an activated carbon layer present on the surface; and
    an adhesive for stably associating a pharmaceutical composition with the activated carbon layer upon application of the pharmaceutical composition to the activated carbon layer.
2. The device according to Clause 1, wherein the pharmaceutical composition is configured to be applied to a topical location of a human.
3. The device according to Clause 2, wherein the pharmaceutical composition is a tape or patch.
4. The device according to any of the preceding clauses, wherein the adhesive is present on the surface of the support.
5. The device according to any of the preceding clauses, wherein the adhesive is combined with the activated carbon layer.
6. The device according to according to any of the preceding clauses, wherein the device further comprises a cover for at least partially covering a pharmaceutical composition when stably associated with the activated carbon layer.
7. The device according to claim 6, wherein the cover comprises an adhesive.
8. The device according to claim 6, wherein the cover is attached to the support.
9. The device according to claim 6, wherein the cover is not attached to the support.
10. A device for use in disposing a pharmaceutical patch, the device comprising:
    a planar foldable support comprising a surface having first and second domains separated by a fold line;
    an adhesive layer present on a surface of the first domain; and
    an activated carbon layer present on a surface of the second domain, wherein the activated carbon layer is dimensioned to correspond to an active agent layer of a pharmaceutical patch.
11. The device according to Clause 10, wherein the activated carbon layer comprises an activated carbon cloth.
12. The device according to Clause 10, wherein the activated carbon layer comprises a substrate material impregnated with activated carbon.
13. The device according to any of Clauses 10 to 12, wherein the second domain comprises one or more liquid passageways extending through the foldable support.
14. The device according to any of Clauses 10 to 13, wherein the activated carbon layer is dimensioned to have no edges that extend to an edge of the second domain of the foldable support.
15. The device according to any of Clauses 10 to 13, wherein the active carbon layer is dimensioned to have at least one edge that extends to an edge of the second domain of the foldable support.
16. The device according to any of Clauses 10 to 15, wherein the device further comprises a liquid absorbent layer positioned between the activated carbon layer and the surface of the second domain.
17. The device according to any of Clauses 10 to 16, wherein the device further comprises an anti-abuse distressing agent present on a surface of the second domain.
18. The device according to Clause 17, wherein the anti-abuse distressing agent comprises a bitter-tasting agent.
19. The device according to any of Clauses 10 to 19, wherein the foldable support comprises a third domain adjacent to the second domain at an edge opposite the fold line.
20. The device according to Clause 19, wherein the third domain comprises an adhesive present on a surface thereof.
21. The device according to Clause 20, wherein the device comprises a first release liner covering the first and second domains and a second release liner covering the third domain.
22. A method of disposing of a pharmaceutical composition, the method comprising:
    contacting the pharmaceutical composition with an activated carbon layer of a device comprising:
    a support having a surface;
    an activated carbon layer present on the surface; and
    an adhesive for stably associating a pharmaceutical composition with the activated carbon layer upon application of the pharmaceutical composition to the activated carbon layer.
23. The method according to Clause 22, wherein the method further comprises covering the pharmaceutical composition with a cover after the pharmaceutical composition has been contacted with the activated carbon layer.
24. A method of disposing a pharmaceutical patch, the method comprising:
    (a) contacting an active agent layer of a pharmaceutical patch with an activated carbon layer of device comprising:
    a planar foldable support comprising a surface having first and second domains separated by a fold line;
    an adhesive layer present on a surface of the first domain; and
    an activated carbon layer present on a surface of the second domain, wherein the activated carbon layer is dimensioned to correspond to an active agent layer of a pharmaceutical patch; and
    (b) folding the foldable support at the fold line so that a portion of the adhesive layer of the first domain contacts a region of the second domain to at least partially enclose the pharmaceutical patch between the first and second domains.
25. The method according to Clause 24, wherein the method comprises contacting the activated carbon layer with a liquid.
26. The method according to Clause 25, wherein the liquid is an aqueous medium.
27. The method according to Clause 26, wherein the activated carbon layer is contacted with the aqueous medium prior to contacting the active agent layer with the activated carbon layer.
28. The method according to Clause 26, wherein the activated carbon layer is contacted with the aqueous medium subsequent to contacting the active agent layer with the activated carbon layer.
29. The method according to Clause 28, wherein the pharmaceutical patch is partially enclosed between the first domain and the second domain in a folded structure after folding and the method comprises introducing the aqueous medium through an opening present at an edge of the folded structure.

30. The method according to Clause 28, wherein the pharmaceutical patch is completely enclosed between the first domain and the second domain in a folded structure after folding and the method comprises introducing the aqueous medium through an opening present in the foldable support of the second domain.
31. The method according any of Clauses 24 to 30, wherein the foldable support comprises a third domain adjacent to the second domain at an edge opposite the fold line, wherein the third domain comprises an adhesive present on a surface thereof and the method further comprises folding the third domain over the first domain after the foldable support is folded at the fold line.
32. The method according to any of Clauses 24 to 31, wherein the method further comprises cutting the active agent layer of the pharmaceutical patch prior to contacting the active agent layer with the activated carbon layer.
33. A kit comprising:
    two or more devices for use in disposing a pharmaceutical patch, each device comprising:
    a planar foldable support comprising a surface having first and second domains separated by a fold line;
    an adhesive layer present on a surface of the first domain; and
    an activated carbon layer present on a surface of the second domain, wherein the activated carbon layer is dimensioned to correspond to an active agent layer of a pharmaceutical patch.
34. The kit according to Clause 33, wherein the kit further comprises an amount of a liquid.
35. The kit according to Clause 34, wherein the liquid is an aqueous medium.
36. A method of manufacturing a device for use in disposing a pharmaceutical patch, the method comprising:
    (a) producing a device comprising:
        a planar foldable support comprising a surface having first and second domains separated by a fold line;
        an adhesive layer present on a surface of the first domain; and
        an activated carbon layer present on a surface of the second domain,
        wherein the activated carbon layer is dimensioned to correspond to an active agent layer of a pharmaceutical patch; and
    (b) positioning a release liner over the adhesive and activated carbon layers of the first and second domains.

The following examples are offered by way of illustration and not by way of limitation. Specifically, the following examples are of specific embodiments for carrying out the present invention. The examples are for illustrative purposes only, and are not intended to limit the scope of the present invention in any way.

EXAMPLES

I. Test of the Deactivation System, Having the "Lay Flat" MedsAway Design, a Carbon Fabric (Zorflex FM 100), and a Wet Method to Facilitate Drug Transfer A. Condition 1:
    Untreated Controls
    A 12.5µ g/hr Duragesic® fentanyl transdermal patch was removed from a release liner and placed into a slowly stirred beaker of 250 ml distilled water (stirring sufficient to circulate water without creating a big vortex). Care was taken to ensure that the drug (adhesive) side of the patch was exposed to circulating water. Samples of the extraction solution were taken and analyzed for fentanyl content at 24 hours.
B. Condition 2:
    MEDSAWAY™ treated patches, tested for effectiveness after an 8-hour treatment time by cutting up a complete disposal system and extracting full contents in a sequence of 24-hour distilled water extraction, followed by 24-hour extraction in 30% ethanol.
Procedure:
    A 12.5 µg/hr Duragesic® fentanyl transdermal patch was placed in MEDSAWAY™ pouch analogous to that disclosed in FIGS. 1A to 1C with the only difference being that the pouch had a tri-fold structure, e.g., as described above. After 8 hours deactivation time, the pouch was cut up into ~3 mm strips using a sharp pair of scissors. The full amount of cut contents were placed into a slowly stirred beaker of 250 ml of distilled water and maintained for 24 hours. The deactivation effectiveness of the MEDSAWAY™ pouch was determined by measuring the extractable fentanyl content and comparing this amount to that found in the untreated condition 1 control test, above. The beaker of distilled water was emptied and replaced with 250 ml of a 30% ethanol solution. The additional amount released into the ethanol solution was measured after an extraction time of 24 hours.
Results:
    For the untreated patches of Condition 1, an average of 1.82 mg of fentanyl was found to be extractable from each patch in distilled water by HPLC analysis of the extraction solution. The MEDSAWAY™ system significantly reduced the extractable content of fentanyl: for the 8-hour treated patches of Condition 2, an average of 0.03 mg was found to be extractable in the distilled water extraction, and an average of 0.07 mg was found to be extractable in the 30% ethanol extraction process.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:
1. A device for disposing a pharmaceutical composition, the device comprising:
    a support having a surface;

an activated carbon layer present on the surface and a liquid absorbent layer positioned between the activated carbon layer and the surface;

an adhesive for stably associating a pharmaceutical composition with the activated carbon layer upon application of the pharmaceutical composition to the activated carbon layer; and a cover for at least partially covering a pharmaceutical composition when stably associated with the activated carbon layer.

2. The device according to claim 1, wherein the device is dimensioned to receive the pharmaceutical composition and the pharmaceutical composition configured to be applied to a topical location of a human.

3. The device according to claim 2, wherein the pharmaceutical composition comprises a tape or patch.

4. The device according to claim 1, wherein the adhesive is present on the surface of the support.

5. The device according to claim 1, wherein the adhesive is combined with the activated carbon layer.

6. The device according to claim 1, wherein the cover comprises an adhesive.

7. The device according to claim 1, wherein the cover is attached to the support.

8. The device according to claim 1, wherein the cover is not attached to the support.

9. A device for use in disposing a pharmaceutical patch, the device comprising:

a planar foldable support comprising a surface having first and second domains separated by a fold line;

an adhesive layer present on a surface of the first domain; and an activated carbon layer present on a surface of the second domain and a liquid absorbent layer positioned between the activated carbon layer and the surface of the second domain, wherein the activated carbon layer is dimensioned to correspond to an active agent layer of a pharmaceutical patch.

10. The device according to claim 9, wherein the activated carbon layer comprises an activated carbon cloth.

11. The device according to claim 9, wherein the activated carbon layer comprises a substrate material impregnated with activated carbon.

12. The device according to claim 9, wherein the activated carbon layer is dimensioned to have no edges that extend to an edge of the second domain of the foldable support.

13. The device according to claim 9, wherein the active carbon layer is dimensioned to have at least one edge that extends to an edge of the second domain of the foldable support.

14. The device according to claim 9, wherein the device further comprises an anti-abuse distressing agent present on a surface of the second domain.

15. The device according to claim 14, wherein the anti-abuse distressing agent comprises a bitter-tasting agent.

16. The device according to claim 9, wherein the foldable support comprises a third domain adjacent to the second domain at an edge opposite the fold line.

17. The device according to claim 16, wherein the third domain comprises an adhesive present on a surface thereof.

18. The device according to claim 17, wherein the device comprises a first release liner covering the first and second domains and a second release liner covering the third domain.

19. A method of disposing of a pharmaceutical composition, the method comprising:

contacting the pharmaceutical composition with an activated carbon layer of a device comprising:

a support having a surface;

an activated carbon layer present on the surface and a liquid absorbent layer positioned between the activated carbon layer and the surface; and an adhesive for stably associating a pharmaceutical composition with the activated carbon layer upon application of the pharmaceutical composition to the activated carbon layer.

20. The method according to claim 19, wherein the method further comprises covering the pharmaceutical composition with a cover after the pharmaceutical composition has been contacted with the activated carbon layer.

21. A method of disposing a pharmaceutical patch, the method comprising:

(a) contacting an active agent layer of a pharmaceutical patch with an activated carbon layer of device comprising:

a planar foldable support comprising a surface having first and second domains separated by a fold line;

an adhesive layer present on a surface of the first domain; and an activated carbon layer present on a surface of the second domain and a liquid absorbent layer positioned between the activated carbon layer and the surface of the second domain, wherein the activated carbon layer is dimensioned to correspond to an active agent layer of a pharmaceutical patch; and (b) folding the foldable support at the fold line so that a portion of the adhesive layer of the first domain contacts a region of the second domain to at least partially enclose the pharmaceutical patch between the first and second domains.

22. The device according to claim 21, wherein the foldable support comprises a third domain adjacent to the second domain at an edge opposite the fold line.

* * * * *